United States Patent [19]

Maddalozzo, Jr. et al.

[11] Patent Number: 5,787,254
[45] Date of Patent: Jul. 28, 1998

[54] WEB BROWSER METHOD AND SYSTEM FOR DISPLAY AND MANAGEMENT OF SERVER LATENCY

[75] Inventors: John Maddalozzo, Jr.; Gerald Francis McBrearty; Johnny Meng-Han Shieh, all of Austin, Tex.

[73] Assignee: International Business Machines Corporation, Armonk, N.Y.

[21] Appl. No.: 818,485

[22] Filed: Mar. 14, 1997

[51] Int. Cl.⁶ ............................................. G06F 13/00
[52] U.S. Cl. ............................ 395/200.58; 395/200.59
[58] Field of Search ........................ 395/200.33, 200.49, 395/200.53, 200.54, 200.55, 200.58, 200.59, 200.57, 339; 707/10

[56] References Cited

U.S. PATENT DOCUMENTS

| | | | |
|---|---|---|---|
| 4,827,508 | 5/1989 | Shear | 380/4 |
| 4,953,209 | 8/1990 | Ryder, Sr. et al. | 380/23 |
| 5,515,490 | 5/1996 | Buchanan et al. | 395/807 |
| 5,572,643 | 11/1996 | Judson | 395/200.48 |
| 5,657,450 | 8/1997 | Rao et al. | 707/10 |

*Primary Examiner*—Parshotam S. Lall
*Assistant Examiner*—Viet Vu
*Attorney, Agent, or Firm*—Richard A. Henkler; Kermit D. Lopez; Andrew J. Dillon

[57] ABSTRACT

A browser extension method and system for a Web browser in a computer network having a client connectable to one or more servers, the client having an interface for displaying a first hypertext document with one or more hypertext links to a second hypertext document located at a server. Initially, an access parameter indicating a selected parameter which describes an access to another hypertext document is associated with a hypertext link. Thereafter, the hypertext link to the second hypertext document is selected in response to user input. Next, an access time period is initiated, during which the hypertext link accesses the second hypertext document, in response to the selection of the hypertext document. Thereafter, the access parameter is displayed in response to initiating the access time period, permitting a user to review the access parameter.

27 Claims, 11 Drawing Sheets

PREFERENCES: METRIC SETTINGS

SHOW LATENCY TIME ON ALL LINKS ?
- ⦿ YES ← 170
- ○ NO ← 168

INDICATE LATENCY TIME BY:
- ○ HIGHLIGHT ← 166
- ○ COLOR ← 164
- ○ FONT ← 162

WEB BROWSER METHOD AND SYSTEM FOR DISPLAY AND MANAGEMENT OF SERVER LATENCY

CROSS-REFERENCE TO RELATED APPLICATIONS

The present invention is related to co-pending applications, Ser. No. 08/818,481, assigned to the assignee herein named and filed of even date herewith.

BACKGROUND OF THE INVENTION

1. Technical Field

The present invention relates in general to information retrieval in data-processing systems. In particular, the present invention relates to data-processing systems which are linked to other data-processing systems by an associated linking network. More particularly, the present invention relates to associated networks which utilize mark-up languages. Still more particularly, the present invention relates to a method and system for effectively managing server latency difficulties.

2. Description of the Related Art

The development of computerized information resources, such as the "Internet" and the proliferation of "web" browsers allow users of data-processing systems to link with other servers and networks, and thus retrieve vast amounts of electronic information heretofore unavailable in an electronic medium. Such electronic information is increasingly displacing more conventional means of information transmission, such as newspapers, magazines, and even television. In communications, a set of computer networks which are possibly dissimilar from one another are joined together by "gateways" that handle data transfer and the conversion of messages from the sending network to the protocols used by the receiving network, with packets if necessary. A gateway is a device used to connect dissimilar networks (i.e., networks utilizing different communication protocols) so that electronic information can be passed from one network to the other. Gateways transfer electronic information, converting such information to a form compatible with the protocols used by the second network for transport and delivery. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Interface Program," a software protocol developed by the Department of Defense for communication between computers.

Electronic information transferred between data-processing networks is usually presented in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among links to the word "iron" in an article displayed within a graphical user interface in a data-processing system might lead the user to the periodic table of the chemical elements (i.e., linked by the word "iron"), or to a reference to the use of iron in weapons in Europe in the Dark Ages. The term "hypertext" was coined in the 1960s to describe documents, as presented by a computer, that express the nonlinear structure of ideas, as opposed to the linear format of books, film, and speech.

The term "hypermedia," on the other hand, more recently introduced, is nearly synonymous with "hypertext" but focuses on the nontextual components of hypertext, such as animation, recorded sound, and video. Hypermedia is the integration of graphics, sound, video, or any combination into a primarily associative system of information storage and retrieval. Hypermedia, as well as hypertext, especially in an interactive format where choices are controlled by the user, is structured around the idea of offering a working and learning environment that parallels human thinking—that is, an environment that allows the user to make associations between topics rather than move sequentially from one to the next, as in an alphabetic list. Hypermedia, as well as hypertext topics, are thus linked in a manner that allows the user to jump from one subject to other related subjects during a search for information. Hyperlink information, such as "World Wide Web" address sites, are contained within hypermedia and hypertext documents, which allow a user to go back to the "original" or referring Web site by the mere "click" (i.e., with a mouse or other pointing device) of the hyper-linked topic.

A typical networked system which utilizes hypertext and hypermedia conventions follows a client/server architecture. The "client" is a member of a class or group that uses the services of another class or group to which it is not related. Thus, in computing, a client is a process (i.e., roughly a program or task) that requests a service provided by another program. The client process utilizes the requested service without having to "know" any working details about the other program or the service itself. Thus, in a client/server architecture, particularly a networked system, a client is usually a computer that accesses shared network resources provided by another computer (i.e., a server).

In such a client/server architecture, a request by a user for news can be sent by a client application program to a server. Such a server is typically a remote computer system accessible over the Internet or other communication medium. The server scans and searches for raw (e.g., unprocessed) information sources (e.g., newswire feeds or newsgroups). Based upon such requests by the user, the server presents filtered electronic information as server responses to the client process. The client process may be active in a first computer system, and the server process may be active in a second computer system, and communicate with one another over a communication medium, thus providing distributed functionality and allowing multiple clients to take advantage of the information-gathering capabilities of the server.

Client and server can communicate with one another utilizing the functionality provided by Hypertext Transfer Protocol (HTTP). The World Wide Web (WWW) or, simply, the Web, includes all the servers adhering to this standard which are accessible to clients via universal resource locators. For example, communication can be provided over a communication medium. In particular, the client and server may be coupled to one another via Serial Line Internet Protocol (SLIP) or TCP/IP connections for high-capacity communication. Active within the client is a first process, known as a "browser," which establishes the connection with the server and presents information to the user. The server itself executes corresponding server software which presents information to the client in the form of HTTP responses. The HTTP responses correspond to Web "pages" constructed from Hypertext Markup Language (HTML), or other server-generated data.

The client and server typically display browsers and other Internet data for a user via a graphical user interface. A graphical user interface is a type of display format that enables a user to choose commands, start programs, and see lists of files and other options by pointing to pictorial representations (i.e., icons) and lists of menu items on the screen. Choices can generally be activated either with a keyboard or a mouse.

A World Wide Web page may have text, graphic images, and even multimedia objects such as sound recordings or moving video clips. A hypertext page, if more than just text, is usually constructed by loading several separate files, e.g., the hypertext file "main.html" might include a reference to a graphic image file "picture.gif" or to a sound file "beep.wav." When a client workstation sends a request to a server for a page, the server first transmits (at least partially) the main hypertext file associated with the page, and then loads, either sequentially or simultaneously, the other files associated with the page. A given file may be transmitted as several separate pieces via TCP/IP protocol. The constructed page is then displayed on the workstation monitor. A page may be "larger" than the physical size of the monitor screen, and techniques such as scroll bars within a graphical user interface are used by the viewing software (the Web browser) to view different portions of the page.

A common problem faced by individuals utilizing Web browsers to search the World Wide Web is the latency due to slow or unreachable Web servers. In such a situation, a user of such a browser usually has no choice but to continue attempting connection to the desired Web site via the Web browser or simply stops the load operation when patience expires. An estimation of the length of time to access such a server is not available to the individual or the Web browser software, thus potentially wasting the individual user's time. A need thus exists for a Web browser extension which would allow a user to obtain an estimation of the length of time to access a server. With such information available to the user, the user can make a decision whether to continue invoking a particular link or to terminate the linking process.

SUMMARY OF THE INVENTION

It is therefore an object of the invention to provide improved information retrieval methods in data-processing systems.

It is another object of the invention to provide an improved method and system which can be utilized with data-processing systems linked to other data-processing systems by associated linking networks.

It is still another object of the invention to provide an improved method and system which effectively manages server latency difficulties.

The above and other objects are achieved as is now described. A browser extension method and system for a Web browser in a computer network having a client connectable to one or more servers, the client having an interface for displaying a first hypertext document with one or more hypertext links to a second hypertext document located at a server. Initially, an access parameter indicating a selected parameter which describes access to another hypertext document is associated with a hypertext link. Thereafter, the hypertext link to the second hypertext document is selected in response to user input. Next, an access time period is initiated, during which the hypertext link accesses the second hypertext document, in response to the selection of the hypertext document. Thereafter, the access parameter is displayed in response to initiating the access time period, permitting a user to review the access parameter.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 10 depicts a Web browser dialog box which allows users to request that metric parameters be associated with all universal resource locator address links encountered by the Web browser in accordance with the method and system of the present invention.

DETAILED DESCRIPTION OF PREFERRED EMBODIMENT

Figure 1:
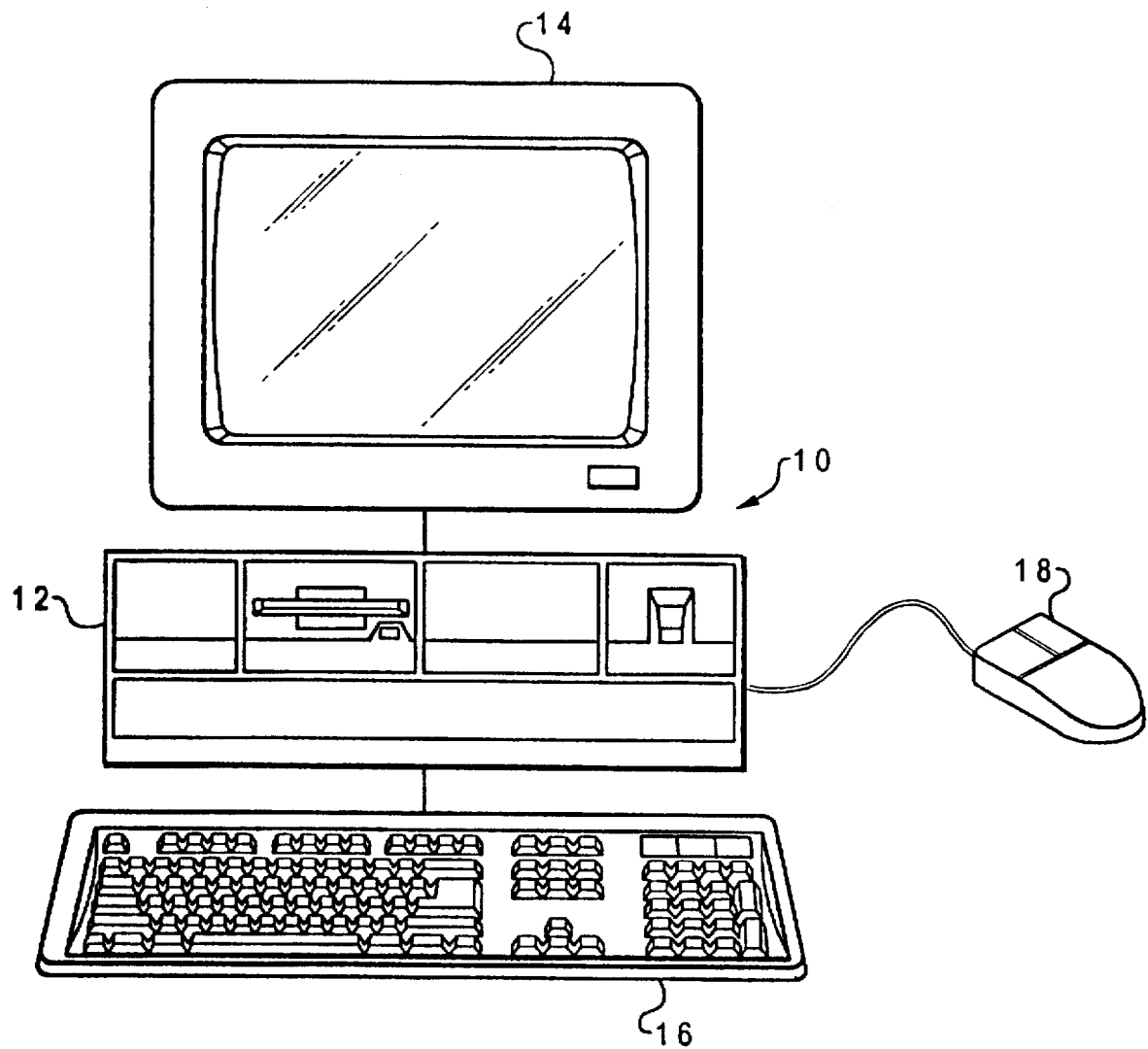
FIG. 1 is a pictorial representation of a data-processing system which can be implemented in accordance with the method and system of the present invention.

With reference now to the figures and in particular with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown) such as a trackball or stylus can also be included with personal computer 10. Personal computer 10 can be implemented utilizing any suitable computer such as an IBM Aptiva™ computer, a product of International Business Machines Corporation, located in Armonk, N.Y. "Aptiva" is a registered trademark of International Business Machines Corporation. Although the depicted embodiment involves a personal computer, a preferred embodiment of the present invention may be implemented in other types of data-processing systems, such as, for example, intelligent workstations or mini-computers. Computer 10 also preferably includes a graphical user interface that resides within a machine-readable media to direct the operation of computer 10.

Figure 2:
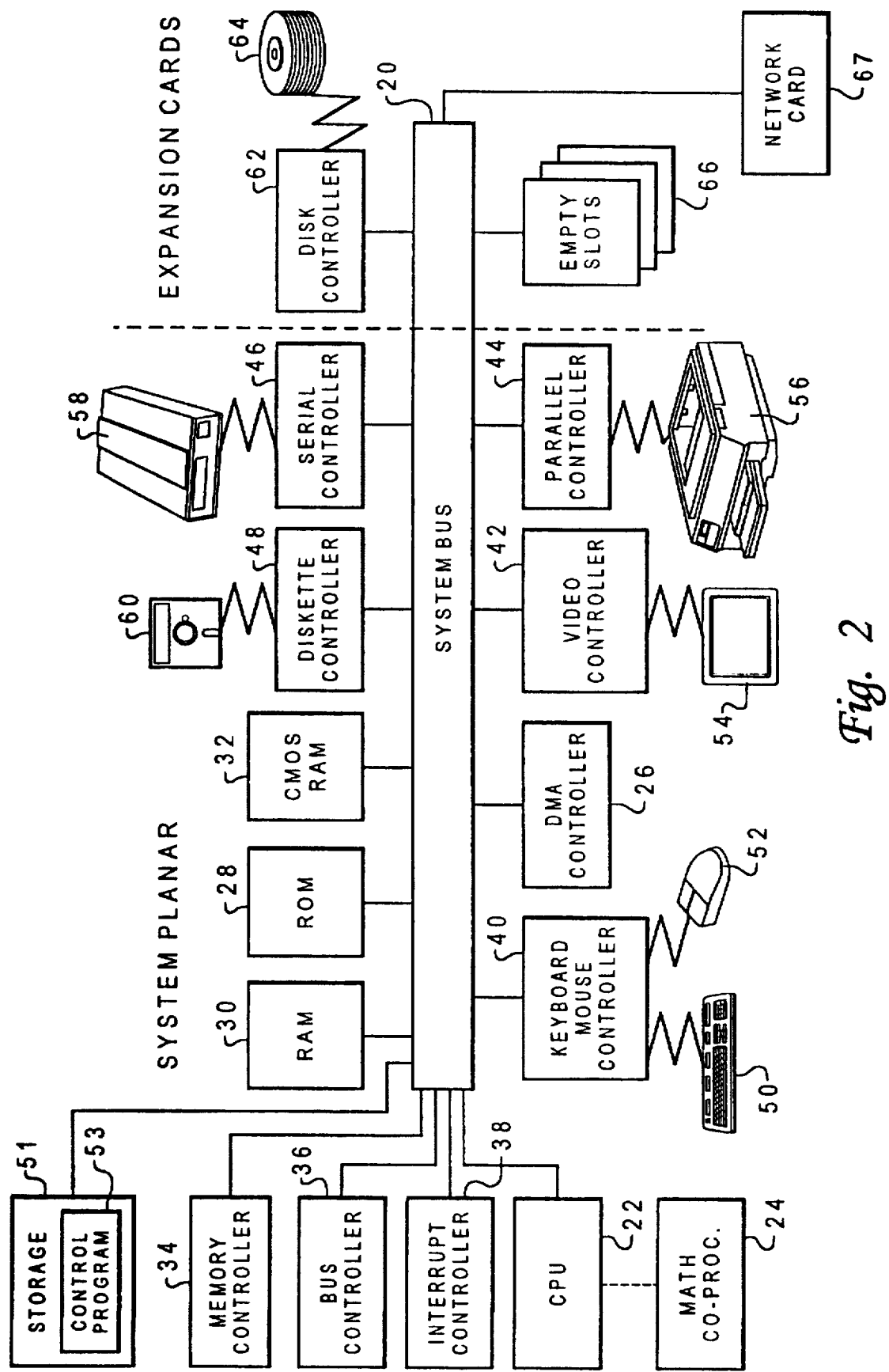
FIG. 2 depicts a block diagram illustrative of selected components in a personal computer system which can be utilized in accordance with the method and system of the present invention.

Referring now to FIG. 2, there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. A microprocessor, such as central processing unit (CPU) 22, is connected to system bus 20 and also may have numeric coprocessor 24 connected to it. Direct memory access (DMA) controller 26 is also connected to system bus 20 and allows various devices to appropriate cycles from CPU 22 during large input/output (I/O) transfers. Read-only memory (ROM) 28 and random-access memory (RAM) 30 are also connected to system bus 20. RAM 30 can support a number of Internet access tools, including, for example, an HTTP-compliant Web browser. ROM 28 is mapped into CPU 22 address space in the range from 640K to 1 megabyte. CMOS RAM 32 is attached to system bus 20 and contains system configuration information. Any suitable machine-readable media may retain the graphical user interface of computer 10 of FIG. 1, such as RAM 30, ROM 28, a magnetic diskette, magnetic tape, or optical disk. Other technologies can also be utilized in conjunction with CPU 22, such as touch-screen technology or human voice control. In addition, computer 10 includes a control program 53 which resides within computer storage 51. Control program 31 contains instructions that when executed on CPU 22 carries out the operations depicted in the logic flow charts described herein.

Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted. In the example depicted in FIG. 2, a computer program product (i.e., control program 53) can reside in computer storage 51. However, it is important that while the present invention has been, and will continue to be, described in a context of a fully functional computer system, those skilled in the art will appreciate that the graphical user interface of the present invention is capable of being distributed as a computer program product via floppy disk, CD ROM, or other form of recordable media or via any type of signal bearing media or electronic transmission mechanism, such as a modem.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices such as printer 56. Serial controller 46 provides a hardware interface for devices such as a modem 58. Diskette controller 48 provides a hardware interface for floppy-disk unit 60.

Expansion cards also may be added to system bus 20, such as disk controller 62, which provides a hardware interface for hard disk unit 64. Empty slots 66 are provided so that other peripherals, adapters, and devices may be added to system unit 12 of FIG. 1. A network card 67 additionally can be connected to system bus 20 in order to link system unit 12 of FIG. 1 to other data-processing system networks in a client/server architecture, or to groups of computers and associated devices which are connected by communications facilities. Those skilled in the art will appreciate that the hardware depicted in FIG. 2 may vary for specific applications. For example, other peripheral devices such as optical disk media, audio adapters, or chip-programming devices such as PAL or EPROM programming devices and the like also may be utilized in addition to or in place of the hardware already depicted. Note that any or all of the above components and associated hardware may be utilized in various embodiments. However, it can be appreciated that any configuration of aforementioned system may be used for various purposes according to a particular implementation.

Figure 3:
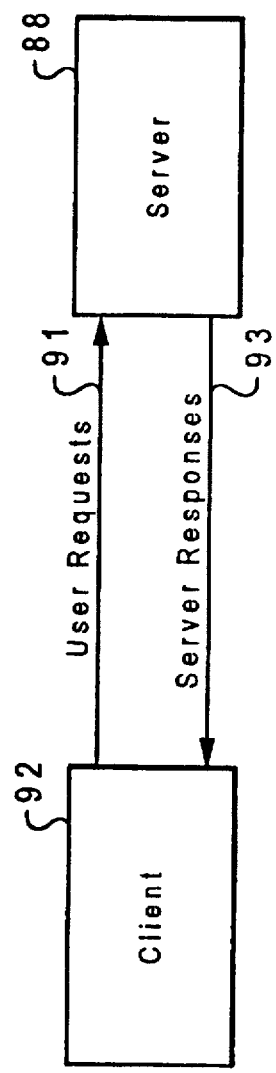
FIG. 3 illustrates a block diagram illustrative of a client/server architecture which can be utilized in accordance with the method and system of the present invention.

FIG. 3 illustrates a block diagram illustrative of a client/server architecture which can be utilized in accordance with the method and system of the present invention. In FIG. 3, user requests 91 for news are sent by a client application program 92 to a server 88. Server 88 can be a remote computer system accessible over the Internet or other communication medium. Client application program 92 may be utilized with computer 10 of FIG. 1 and the implementation of computer 10 illustrated in FIG. 2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communication medium, thus providing distributed functionality and allowing multiple clients to take advantage of the information-gathering capabilities of the server.

Figure 4:
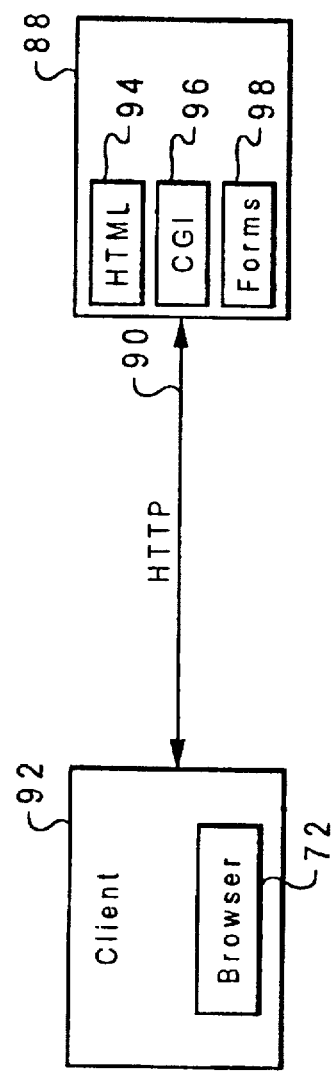
FIG. 4 depicts a detailed block diagram illustrative of a client/server architecture which can be utilized in accordance with the method and system of the present invention.

FIG. 4 illustrates a detailed block diagram of a client/server architecture which can be utilized in accordance with the method and system of the present invention. Although the client and server are processes which are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate using the functionality provided by Hypertext Transfer Protocol (HTTP). The World Wide Web or the "Web" includes all the servers adhering to this standard which are accessible to clients via universal resource locators. Active within client 92 is a first process, browser 72, which establishes the connections with server 88 and presents information to the user. Any number of commercially or publicly available browsers may be used, in various implementations, such as the Mosaic-brand browser available from the National Center for Supercomputing Applications (NCSA) in Urbana-Champaign, Ill. Other browsers, such as Netscape™, provide the functionality specified under HTTP and the Mosaic browser can be utilized with the present invention. "Netscape" is a trademark of Netscape, Inc.

Server 88 executes the corresponding server software which presents information to the client in the form of HTTP responses 90. The HTTP responses 90 correspond with the Web "pages" represented using Hypertext Markup Language (HTML), or other data which is generated by the server. For example, under the Mosaic-brand browser, in addition to HTML functionality 94 provided by server 88 (i.e., display and retrieval of certain textual and other data based upon hypertext views and selection of item(s)), a Common Gateway Interlace (CGI) 96 is provided which allows the client program to direct server 88 to commence execution of a specified program contained within server 88. This may include a search engine which scans received information in the server for presentation to the user controlling the client. Using this interface, and HTTP responses 90, the server may notify the client of the results of that execution upon completion.

Figure 5:
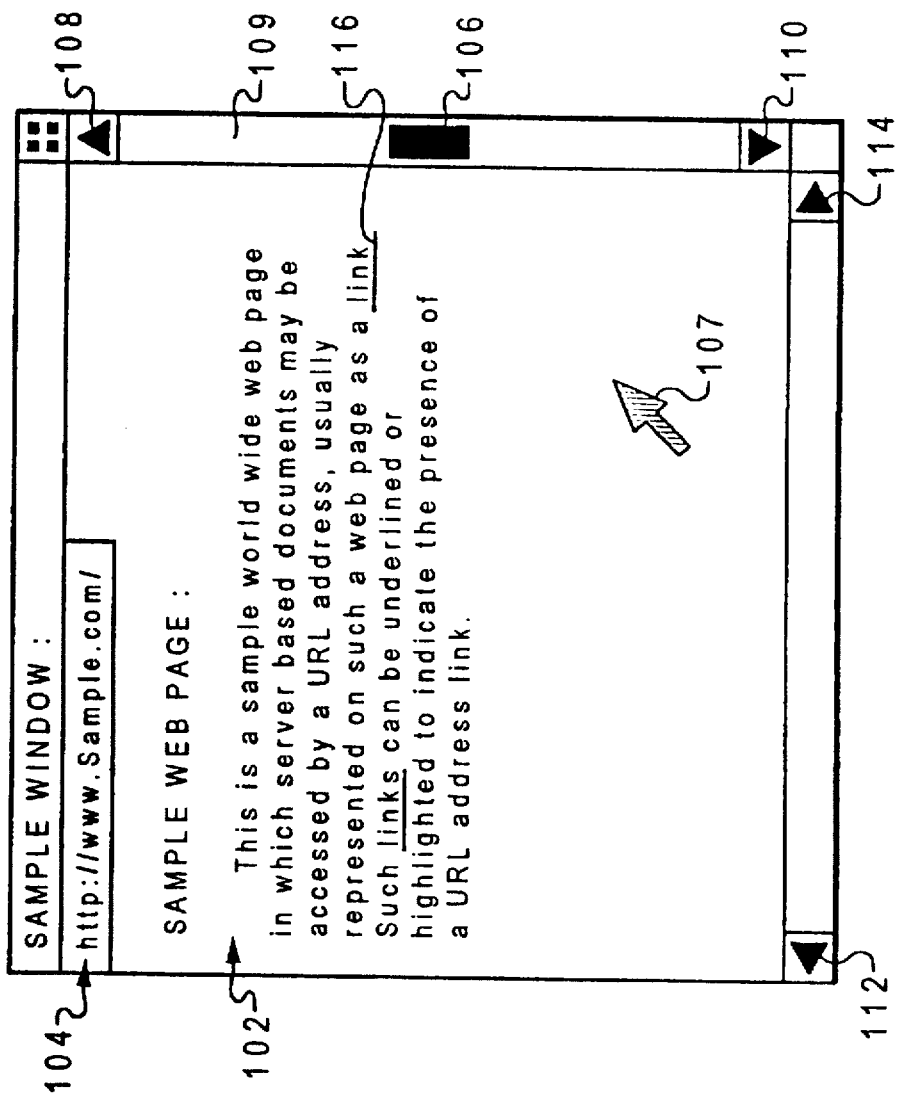
FIG. 5 illustrates a graphical user interface window in which a sample Web page is displayed in accordance with the method and system of the present invention.

FIG. 5 illustrates a graphical user interface window 100 in which a sample World Wide Web page 102 is displayed in accordance with the method and system of the present invention. A graphical user interface is a type of display format that enables a user to choose commands, start programs, and see lists of files and other options by pointing to pictorial representations (icons) and lists of menu items on the screen. Choices can generally be activated by either a keyboard or a mouse. The size and position of elevator 106 within scroll bar 109 corresponds to the size and position of the current viewable page in relation to the document displayed within window 100. Note that in FIG. 5, FIG. 7, and FIG. 8, like parts are indicated by like numbers.

In the example window depicted in FIG. 5, because sample Web page 102 includes too many pages to view simultaneously, the user can position a mouse cursor over arrow section 108 or arrow section 110 of scroll bar 109 and click a pointing device (e.g., a mouse) to scroll the document upward or downward, as appropriate. Scrolling in this manner permits viewing of any desired portion of the document. Scrolling is the electronic equivalent of reading through a rolled (i.e., "scrolled") document rather than flipping through pages of a book. Arrow sections 112 and 114 allow a user to scroll respectively left or right.

Window 100 includes an area dedicated to a universal resource locator (URL) address. A Web browser utilized by the graphical user interface searches specific address links. Internet services are typically accessed by specifying a unique address, or URL. The URL has two basic components, the protocol to be used and the object pathname. For example, the URL "http://www.uspto.gov" (i.e., home page for the U.S. Patent and Trademark Office) specifies a hypertext transfer protocol (http) and a pathname of the server (www.uspto.gov). The server name is associated with a unique numeric value (TCP/IP address). In the example depicted in FIG. 5, sample Web page 102 is referred to by the URL "http://www.sample.com" (home page for the Sample Web Page). Sample Web page 102 includes links 116 which are typically underlined or highlighted to indicate the presence of a URL address link. If a Web browser user desires to go to the linked page, the user simply places cursor pointer 107 with a mouse or other pointing device over link 116 and activates the pointing device to access the linked page or document.

Hypertext Markup Language uses so-called "tags," denoted typically by the <> symbols, with the actual tag between the brackets. Most tags have a beginning (<tag>) and an ending section, with the end shown by the slash symbol (</tag>). There are numerous link tags in HTML to enable the viewer of the document to jump to another place in the same document, to jump to the top of another document, to jump to a specific place in another document, or to create and jump to a remote link (i.e., via a new URL) to another server. Links are typically displayed on a Web page in color or with an underscore. In response to the user pointing and clicking on the link, the link is said to be "activated" to begin the download of the linked document or text.

Figure 6A:
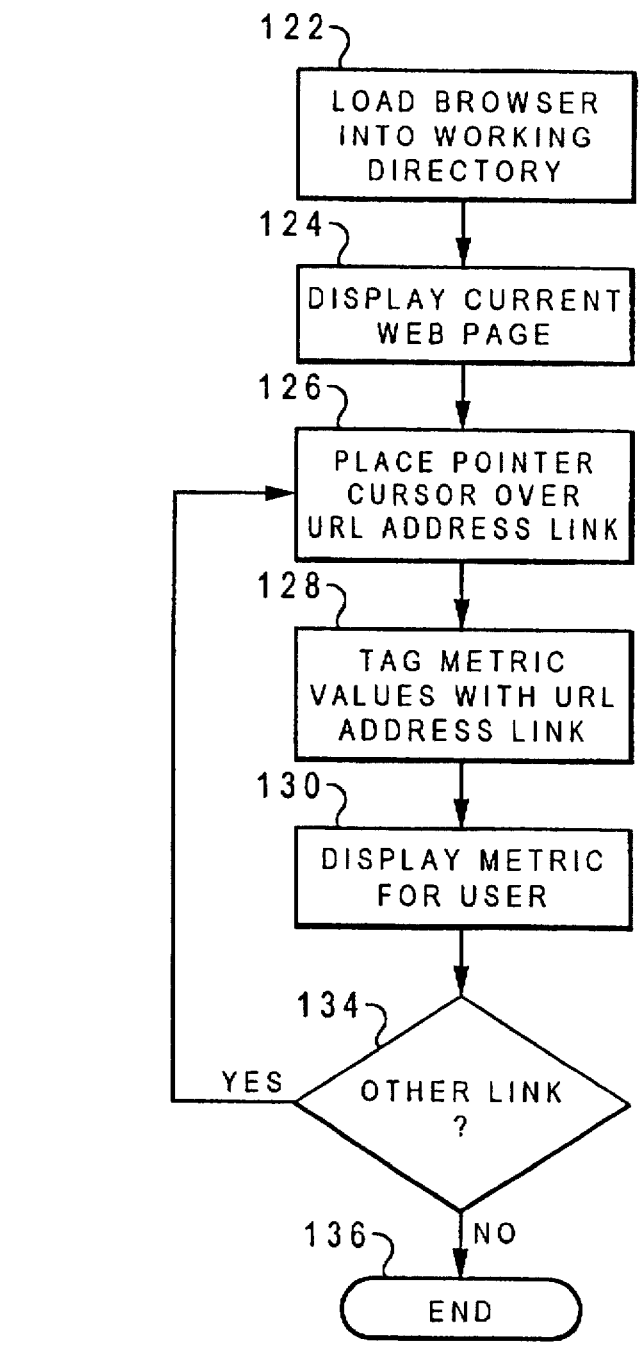
FIG. 6(a) depicts a high-level logic diagram illustrative of a Web browser extension method for displaying metric parameters associated with a universal resource locator address link in accordance with the method and system of the present invention.
Figure 6B:
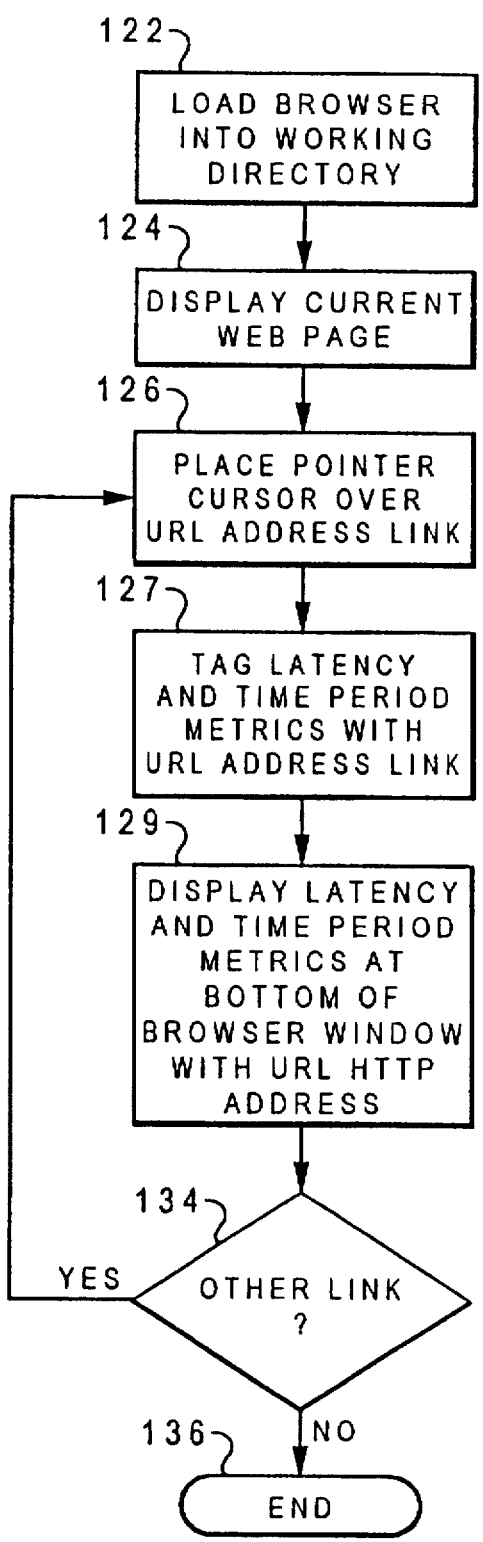
FIG. 6(b) depicts a high-level logic diagram illustrative of a Web browser extension method for displaying at the bottom of a Web browser specific metric parameters associated with a universal resource locator address link in accordance with the method and system of the present invention.
Figure 6C:
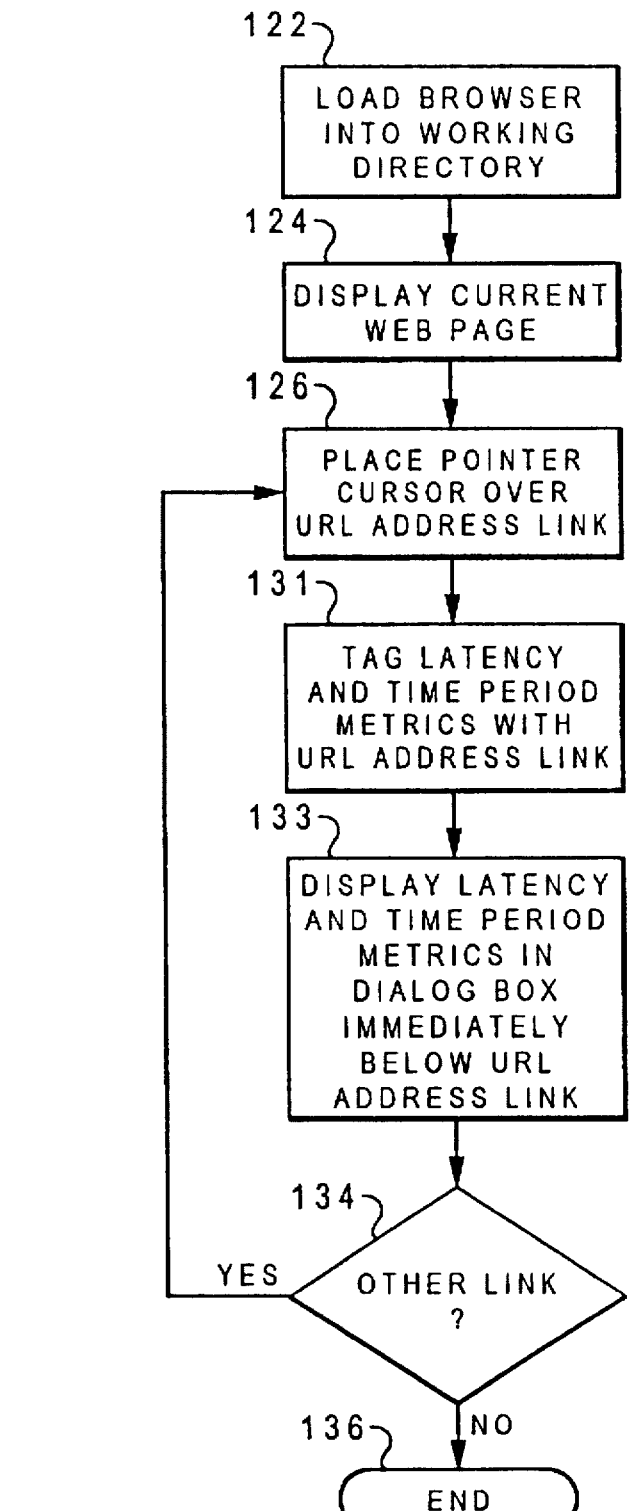
FIG. 6(c) depicts a high-level logic diagram illustrative of a Web browser extension method for displaying in a Web browser dialog box, specific metric parameters associated with a universal resource locator address link in accordance with the method and system of the present invention.

In FIG. 6(a), FIG. 6(b), and FIG. 6(c), like parts are indicated by like numbers. FIG. 6(a) depicts a high-level logic diagram 120 illustrative of a Web browser extension method for displaying metric parameters associated with a URL address link in accordance with the method and system of the present invention. The method depicted in FIG. 6(a) permits a relatively simple metric regarding a specific link to be displayed. Typically, when a user indicates a desired link with a mouse pointer or other pointing device, the browser displays at some portion of the browser window, the actual HTTP link information. By applying the method illustrated in FIG. 6(a), a Web browser extension tags a metric value to the desired link information. Such a metric can be as uncomplicated as displaying the number of milliseconds required to receive notification back from the server or something more sophisticated, such as an estimation of the data rate available. The term "metric parameter" as utilized herein refers also to "access parameters." For example, an access parameter can include a time-access parameter which indicates an estimated length of time of an access time period. An access time period is the period in which a given link is accessed utilizing a Web browser. Another example of an access parameter is that of a data rate access parameter which indicates an estimated data retrieval rate for data retrieved from a server by a client during such an access time period.

As depicted at block 122, a Web browser is initially loaded into a working directory of a data-processing system. As illustrated at block 124, a Web page is displayed by the graphical user interface for access by the user. As depicted at block 126, a cursor pointer such as mouse pointer 107 depicted in FIG. 5, is placed over the URL address link. As described at block 128, the Web browser extension tags metric values with the URL address link. Thus, the Web browser extension of the present invention tags metric values to the actual HTTP link information (i.e., URL address link). As depicted at block 130, the metrics are then displayed within the Web browser graphical user interface for utilization by a user. An example of a metric which can be tagged and displayed in the aforementioned manner is the number of milliseconds required to receive notification from the server having the URL address link over which the cursor pointer is located. Another type of metric which can be displayed in the aforementioned manner is an estimation of the data rate available.

Such metrics can be calculated utilizing, for example, UNIX algorithms well-known in the art of computer programming, for estimating the time required to access a particular Web site via a given URL address link or download a particular file from a particular Web site. UNIX is an operating system that features multiprogramming in a multi-user environment. UNIX is a trademark of UNIX systems Laboratories, Inc. As described at block 134, a question is asked whether or not another link is desired. If so, the process of placing the pointer over another URL address link as depicted at block 126 is repeated. If not (i.e., if the user does not place the cursor pointer over another URL address link), the method ends, as illustrated at block 136.

FIG. 6(b) depicts a high-level logic diagram 121 illustrative of a Web browser extension method for displaying at the bottom of a Web browser, specific metric parameters associated with a universal resource locator address link in accordance with the method and system of the present invention. As depicted at block 122, a Web browser is initially loaded into a working directory of a data-processing system. As illustrated at block 124, a Web page is displayed by the graphical user interface for access by the user. As depicted at block 126, a cursor pointer, such as mouse pointer 107 depicted in FIG. 5, is placed over the URL address link. It is not necessary to "click" the pointing device when mouse pointer 107 is placed over the URL address link. Simply placing the mouse pointer 107 over the URL address link prompts the graphical user interface operating within the data-processing system to display only the latency and time-period metric values. However, an actual "click" over the URL address link will prompt the graphical user interface to display the URL address and the latency and time period metric values, as depicted at block 127.

Thus, as described at block 127, the Web browser extension tags latency and time-period metric value to the URL address link. Thus, the Web browser extension method of the present invention as depicted in FIG. 6(b) tags latency and time-period metric values to the actual HTTP link information (i.e., URL address link). As depicted at block 129, the latency and time-period metrics are then displayed at the bottom of the Web browser graphical user interface for utilization by a user. Such metric values can be located next to the actual HTTP link information. As described at block 134, a question is asked whether or not another link is desired. If so, the process of placing the pointer over another URL address link as depicted at block 126 is repeated. If not (i.e., if the user does not place the cursor pointer over another URL address link), the method ends, as illustrated at block 136.

FIG. 6(c) depicts a high-level logic diagram 123 illustrative of a Web browser extension method for displaying in a Web browser dialog box, specific metric parameters associated with a universal resource locator address link in accordance with the method and system of the present invention. As depicted at block 122, a Web browser is initially loaded into a working directory of a data-processing system. As illustrated at block 124, a Web page is displayed by the graphical user interface for access by the user. As depicted at block 126, a cursor pointer such as mouse pointer 107 depicted in FIG. 5, is placed over the URL address link. As described at block 131, the Web browser extension tags latency and time-period metric value to the URL address link. Thus, the Web browser extension method of the present invention as depicted in FIG. 6(c), tags latency and time-period metric values to the actual HTTP link information (i.e., URL address link). As depicted at block 133, the latency and time period metrics are then displayed underneath the link pointed to by the cursor pointer. Such metric values can be located next to the actual HTTP link information. As described at block 134, a question is asked whether or not another link is desired. If so, the process of placing the pointer over another URL address link as depicted at block 126 is repeated. If not (i.e., if the user does not place the cursor pointer over another URL address link), the method ends, as illustrated at block 136.

Figure 7:
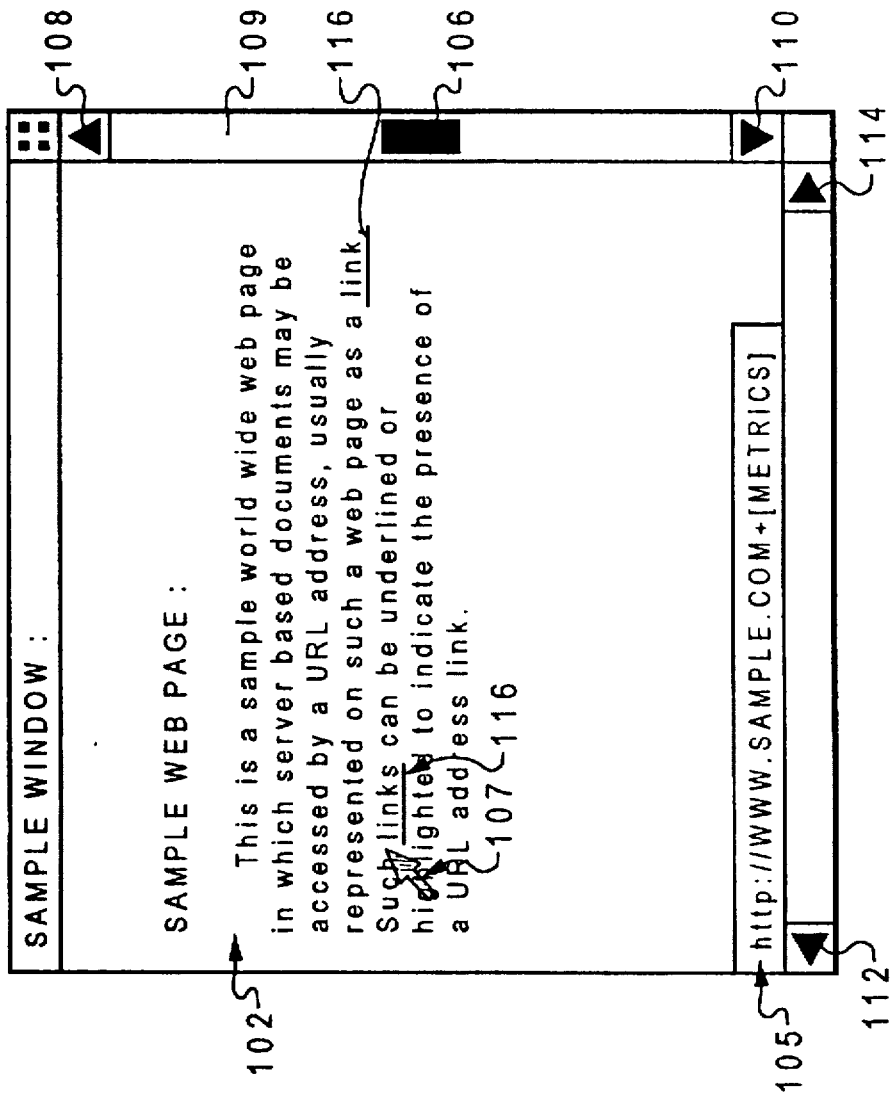
FIG. 7 illustrates a graphical user interface window in which a sample Web page is displayed with specific metric parameters located at the bottom of the sample Web browser in accordance with the method and system of the present invention.

FIG. 7 illustrates a graphical user interface window 137 in which a sample Web page 102 is displayed with specific metric parameters located at the bottom of the sample Web page in accordance with the method and system of the present invention. Window 137 as depicted in FIG. 7 is an example implementation of the method described in FIG. 6(b) in which specific metric parameters associated with a universal resource locator address link can be located at the bottom of sample Web page 102. Thus, cursor pointer 107 is placed over link 116. When cursor pointer 107 is placed over link 116, the URL address link information along with the metric information is displayed at the bottom of Web page 102.

Figure 8:
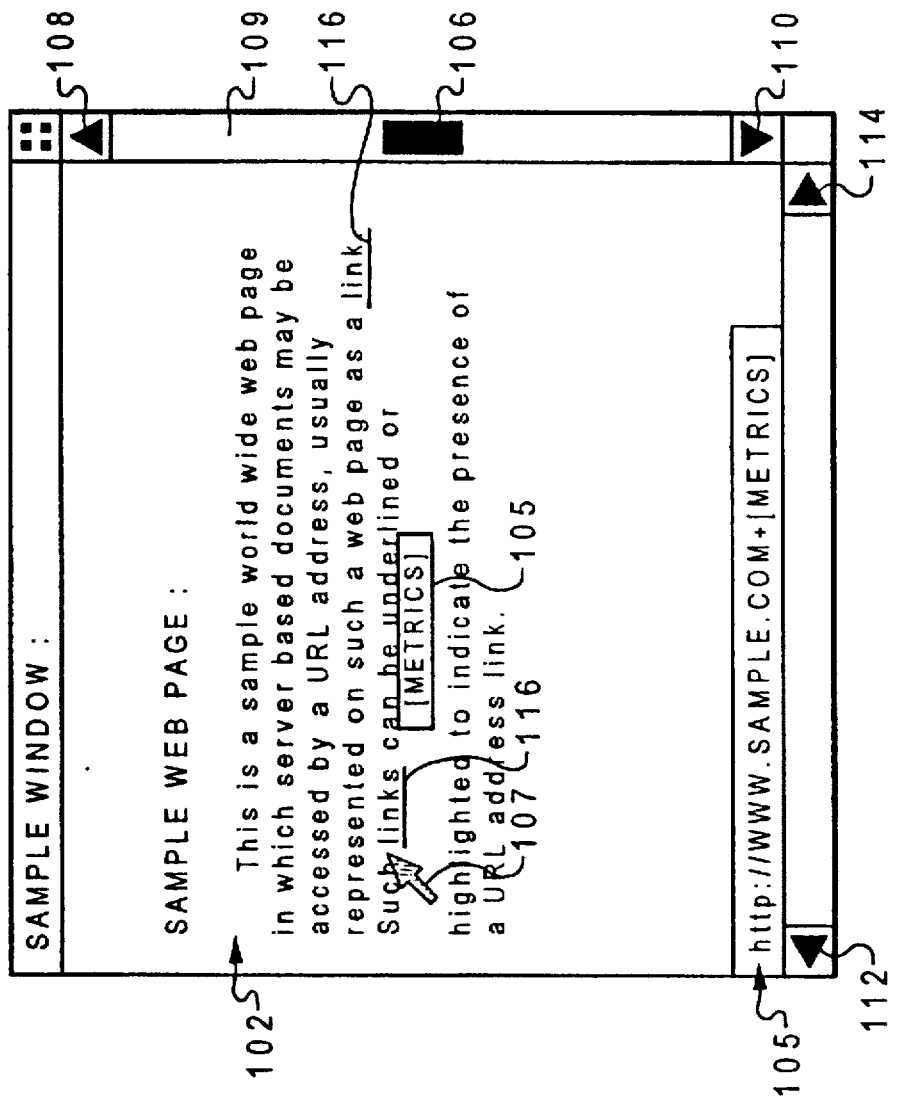
FIG. 8 illustrates a graphical user interface window in which a sample Web page is displayed with specific metric parameters located beneath a universal resource locator address link in accordance with the method and system of the present invention.

FIG. 8 illustrates a graphical user interface window 139 in which a sample Web page 102 is displayed with specific metric parameters located at or near link 116 within a dialog box 105 in accordance with the method and system of the present invention. Window 139 as depicted in FIG. 8 is an example implementation of the method described in FIG. 6(c) in which specific metric parameters associated with a universal resource locator address link can be located below link 116. Thus, cursor pointer 107 is placed over link 116. When cursor pointer 107 is placed over link 116, the URL address link information along with the metric information is displayed in a dialog box 105 below link 116. Although not depicted in FIG. 8, copies of dialog box 105 with identical metric information can be optionally located below or alongside every identical link 116.

Figure 9:
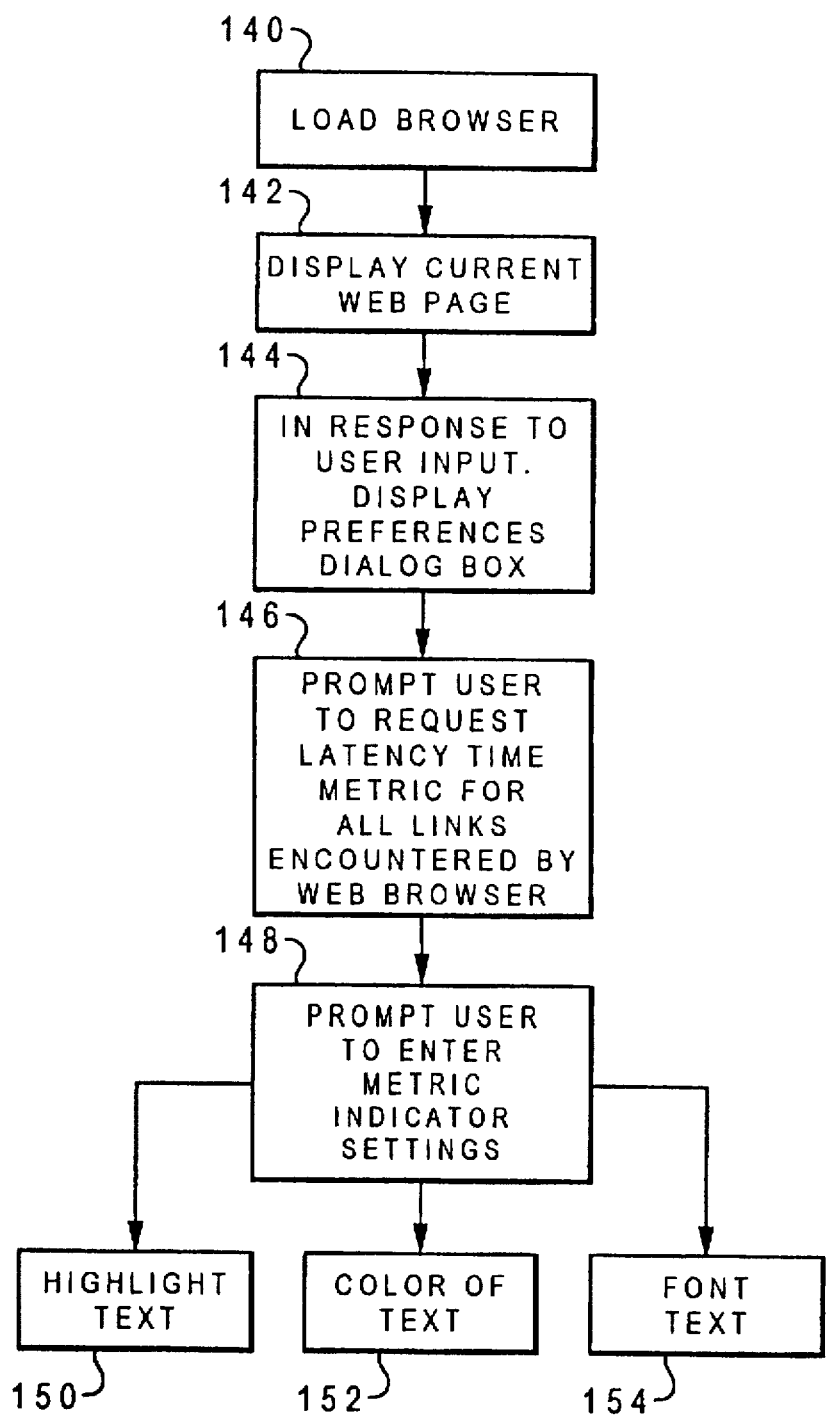
FIG. 9 depicts a high-level logic diagram illustrative of a Web browser extension method for associating metric parameters with all universal resource locator address links encountered by the Web browser in accordance with the method and system of the present invention.

FIG. 9 depicts a high-level logic diagram 141 illustrative of a Web browser extension method for associating metric parameters with all universal resource locator address links encountered by the Web browser in accordance with the method and system of the present invention. As depicted at block 140, a Web browser is initially loaded into a working directory of a data-processing system. As illustrated at block 142, a Web page is displayed by the graphical user interface for access by the user. As depicted at block 144, in response to user input, a browser "preferences" dialog box is displayed. A dialog box is a secondary window that is used to supplement the interaction in the primary window it is dependent upon. Among the preferences indicated in the dialog box are latency time settings. For example, the user can be prompted to indicate whether a latency time indicator is desired for all links.

Latency time for each link can be implemented by highlighting, coloring, or changing the font of the link text. As depicted at block 146, the user is thus prompted to request a latency time metric for all links encountered by the Web browser. As illustrated at block 148, the user is then prompted to enter metric indicator settings (i.e., whether or not the user desires such metrics to be indicated by highlighting, coloring, or changing the font of the link text). Depending upon the choice made by the user, the link text is highlighted as described at block 150, colored as depicted at block 152, or given a new font which stands out from the surrounding Web page text as indicated at 154. Thus, when these settings are made by the user, every link encountered by the user will reveal a metric. For example, all highlighted link text can indicate to a user that activating that particular link with a cursor pointer will result in a lengthy latency time period. Link text which is not highlighted will have a shorter latency time period.

FIG. 10 depicts a Web browser dialog box 160 which allows users to request that metric parameters be associated with all universal resource locator address links encountered by the Web browser in accordance with the method and system of the present invention. Radio buttons are located within dialog box 160 which allow a user to indicate whether or not to display latency time-period metrics for all links encountered by the Web browser and how to indicate such latency time-period metrics. A radio button is a graphical user interface control utilized to display mutually exclusive textual setting choices. Radio button 162 can be utilized by the present invention to indicate latency time by font of the link text. Radio button 164 can be utilized by the present invention to indicate latency time by color of the link text. Radio button 166 can be utilized by the present invention to indicate latency time by highlighting the link text. Radio buttons 168 and 170 are utilized to indicate whether the latency time indicated by radio buttons 166, 164, or 162 will appear on the screen for all links. For example, if radio button 166 and radio button 170 are activated by the user, all links having the aforementioned latency time-period metrics are highlighted.

The present invention is adapted for use with the Internet's World Wide Web, but it is generally applicable to any network which provides files or "pages" having links that allow retrieval of other pages. While the invention has been particularly shown as described with reference to a preferred embodiment, it will be understood by those skilled in the art that various changes in form and detail may be made therein without departing from the spirit and scope of the invention.

What is claimed is:

1. A browser extension method for a browser in a computer network having at least one client connectable to one or more servers, said client having an interface for displaying a first hypertext document with at least one hypertext link to a second hypertext document located at a server, comprising the steps of:
    associating at least one access parameter with said at least one hypertext link, wherein said at least one access parameter includes:
        a time access parameter value wherein said time access parameter value indicates an estimated length of time of an access time period; and
        a data rate access parameter value wherein said data rate access parameter value indicates an estimated data retrieval rate for data retrieved from said server during said access time period;
    selecting said at least one hypertext link to said second hypertext document in response to user input;
    initiating an access time period during which said at least one hypertext link accesses said second hypertext document in response to said selection;
    displaying said at least one access parameter in response to initiation of said access time period; and
    displaying a preferences dialog box in response to user input, wherein said user is prompted to request at least one latency time parameter for said at least one hypertext link encountered by said browser.

2. The method of claim 1 further comprising the step of displaying a dialog box in which said at least one access parameter associated with said at least one hypertext link is displayed.

3. The method of claim 2 further comprising the step of prompting said user to indicate a display preference for said at least one latency time parameter wherein said display preference may be indicated by highlighting, coloring, or altering a font of said at least one hypertext link.

4. The method of claim 3 further comprising the step of displaying said at least one access parameter in a vicinity of said first hypertext document near said at least one hypertext link.

5. A browser extension system for a browser in a computer network having at least one client connectable to one or more servers, said client having an interface for displaying a first hypertext document with at least one hypertext link to a second hypertext document located at a server, comprising the steps of:
    means for associating at least one access parameter with said at least one hypertext link, wherein said at least one access parameter includes:
        a time access parameter value wherein said time access parameter value indicates an estimated length of time of an access time period; and
        a data rate access parameter value wherein said data rate access parameter value indicates an estimated data retrieval rate for data retrieved from said server during said access time period;
    means for selecting said at least one hypertext link to said second hypertext document in response to user input;
    means for initiating an access time period during which said at least one hypertext link accesses said second hypertext document in response to said selection;
    means for displaying said at least one access parameter in response to initiation of said access time period; and
    means for displaying a preferences dialog box in response to user input wherein said user is prompted to request at least one latency time parameter for said at least one hypertext link encountered by said browser.

6. The system of claim 5 further comprising means for displaying a dialog box in which said at least one access parameter associated with said at least one hypertext link is displayed.

7. The system of claim 6 further comprising means for prompting said user to indicate a display preference for said at least one latency time parameter wherein said display preference may be indicated by highlighting, coloring, or altering a font of said at least one hypertext link.

8. The system of claim 7 further comprising means for displaying said at least one access parameter in a vicinity of said first hypertext document near said at least one hypertext link.

9. A computer program product residing in computer memory in a data-processing system for permitting a browser extension for a browser in a computer network having at least one client connectable to one or more servers, said client having an interface for displaying a first hypertext document with at least one hypertext link to a second hypertext document located at a server, said computer program product comprising:
    association means for associating at least one access parameter with said at least one hypertext link, wherein said at least one access parameter includes:
        a time access parameter value wherein said time access parameter value indicates an estimated length of time of an access time period; and
        a data rate access parameter value wherein said data rate access parameter value indicates an estimated data retrieval rate for data retrieved from said server during said access time period;
    selection means for selecting said at least one hypertext link to said second hypertext document in response to user input;
    initiation means for initiating an access time period during which said at least one hypertext link accesses said second hypertext document in response to said selection;

display means for displaying said at least one access parameter in response to initiation of said access time period;

preferences dialog display means for displaying a preferences dialog box in response to user input wherein said user is prompted to request at least one latency time parameter for said at least one hypertext link encountered by said browser; and first signal-bearing media bearing said association means, said selection means, said initiation means, and said display means, and said preferences dialog display means.

10. The computer program product of claim 9 further comprising dialog display means for displaying a dialog box in which said at least one access parameter associated with said at least one hypertext link is displayed.

11. The computer program product of claim 10 further comprising prompting means for prompting said user to indicate a display preference for said at least one latency time parameter wherein said display preference may be indicated by highlighting, coloring, or altering a font of said at least one hypertext link.

12. The computer program product of claim 11 further comprising access parameter display means for displaying said at least one access parameter in a vicinity of said first hypertext document near said at least one hypertext link.

13. The computer program product of claim 12 further comprising second signal-bearing means bearing said dialog display means, said prompting means, and said access parameter display means.

14. The computer program product of claim 13 wherein:
said first signal-bearing means further comprises recordable media; and
said second signal-bearing means further comprises recordable media.

15. The computer program product of claim 13 wherein:
said second signal-bearing means further comprises transmission media; and
said second signal-bearing means further comprises transmission media.

16. A browser extension method for a browser in a computer network having at least one client connectable to one or more servers, said client having an interface for displaying a first hypertext document with at least one hypertext link to a second hypertext document located at a server, comprising the steps of:

associating at least one access parameter with said at least one hypertext link, wherein said at least one access parameter includes:
a time access parameter value wherein said time access parameter value indicates an estimated length of time of an access time period; and
a data rate access parameter value wherein said data rate access parameter value indicates an estimated data retrieval rate for data retrieved from said server during said access time period;

selecting said at least one hypertext link to said second hypertext document in response to user input;

initiating an access time period during which said at least one hypertext link accesses said second hypertext document in response to said selection;

displaying said at least one access parameter in response to initiation of said access time period;

displaying a dialog box in which said at least one access parameter associated with said at least one hypertext link is displayed; and displaying a preferences dialog box in response to user input wherein said user is prompted to request at least one latency time parameter for said at least one hypertext link encountered by said browser.

17. The method of claim 16 further comprising the step of prompting said user to indicate a display preference for said at least one latency time parameter wherein said display preference may be indicated by highlighting, coloring, or altering a font of said at least one hypertext link.

18. The method of claim 17 further comprising the step of displaying said at least one access parameter in a vicinity of said first hypertext document near said at least one hypertext link.

19. A browser extension system for a browser in a computer network having at least one client connectable to one or more servers, said client having an interface for displaying a first hypertext document with at least one hypertext link to a second hypertext document located at a server, comprising the steps of:

means for associating at least one access parameter with said at least one hypertext link, wherein said at least one access parameter includes:
a time access parameter value wherein said time access parameter value indicates an estimated length of time of an access time period; and
a data rate access parameter value wherein said data rate access parameter value indicates an estimated data retrieval rate for data retrieved from said server during said access time period;

means for selecting said at least one hypertext link to said second hypertext document in response to user input;

means for initiating an access time period during which said at least one hypertext link accesses said second hypertext document in response to said selection;

means for displaying said at least one access parameter in response to initiation of said access time period;

means for displaying a dialog box in which said at least one access parameter associated with said at least one hypertext link is displayed; and means for displaying a preferences dialog box in response to user input, wherein said user is prompted to request at least one latency time parameter for said at least one hypertext link encountered by said browser.

20. The system of claim 19 further comprising means for prompting said user to indicate a display preference for said at least one latency time parameter wherein said display preference may be indicated by highlighting, coloring, or altering a font of said at least one hypertext link.

21. The system of claim 20 further comprising means for displaying said at least one access parameter in a vicinity of said first hypertext document near said at least one hypertext link.

22. A computer program product residing in computer memory in a data-processing system for permitting a browser extension for a browser in a computer network having at least one client connectable to one or more servers, said client having an interface for displaying a first hypertext document with at least one hypertext link to a second hypertext document located at a server, said computer program product comprising:

association means for associating at least one access parameter with said at least one hypertext link, wherein said at least one access parameter includes:
a time access parameter value wherein said time access parameter value indicates an estimated length of time of an access time period; and a data rate access parameter value wherein said data rate access parameter value indicates an estimated data retrieval rate for data retrieved from said server during said access time period;

selection means for selecting said at least one hypertext link to said second hypertext document in response to user input;

initiation means for initiating an access time period during which said at least one hypertext link accesses said second hypertext document in response to said selection;

display means for displaying said at least one access parameter in response to initiation of said access time period;

first signal-bearing media bearing said association means, said selection means, said initiation means, and said display means;

dialog display means for displaying a dialog box in which said at least one access parameter associated with said at least one hypertext link is displayed; and dialog display means for displaying a preferences dialog box in response to user input, wherein said use is prompted to request at least one latency time parameter for said at least one hypertext link encountered by said browser.

23. The program product of claim 22 further comprising prompting means for prompting said user to indicate a display preference for said at least one latency time parameter wherein said display preference may be indicated by highlighting, coloring, or altering a font of said at least one hypertext link.

24. The computer program product of claim 23 further comprising access parameter display means for displaying said at least one access parameter in a vicinity of said first hypertext document near said at least one hypertext link.

25. The computer program product of claim 24 further comprising second signal-bearing means bearing said dialog display means, said preferences dialog display means, said prompting means, and said access parameter display means.

26. The computer program product of claim 25 wherein:
said first signal-bearing means further comprises recordable media; and
said second signal-bearing means further comprises recordable media.

27. The computer program product of claim 25 wherein:
said second signal-bearing means further comprises transmission media; and
said second signal-bearing means further comprises transmission media.

* * * * *